April 29, 1941.   D. F. NEWMAN   2,240,193
REFRIGERATOR
Filed May 19, 1939

Inventor:
Delbert F. Newman,
by Harry E. Dunham
His Attorney.

Patented Apr. 29, 1941

2,240,193

UNITED STATES PATENT OFFICE 2,240,193

REFRIGERATOR

Delbert F. Newman, Schenectady, N. Y., assignor to General Electric Company, a corporation of New York Application May 19, 1939, Serial No. 274,521

12 Claims. (Cl. 62—1)

My invention relates to refrigerators and more particularly to food storage receptacles associated with the refrigerated compartments of refrigerators for storing meats and the like.

The air in a refrigerated compartment of a domestic type refrigerator is usually maintained at an average temperature between 40° F. and 45° F. for general refrigeration purposes. An average temperature within this range may be maintained in a refrigerated compartment by the convection currents of air set up therein by a cooling unit or refrigerant evaporator located within the refrigerated compartment. In the usual refrigerator this result is obtained by maintaining the temperature of the surface of the evaporator considerably below 32° F., for example, approximately 20° F. While a storage atmosphere having a temperature within the range mentioned is satisfactory for the preservation of foods in general, certain types of foods such, for example, as meats and fish, may be more satisfactorily preserved in a storage atmosphere having a lower temperature range, as for example, between 30° F. and 34° F. Therefore, it is an object of my invention to provide an improved arrangement of a food storage receptacle in the refrigerated compartment of a refrigerator which is adapted to maintain a storage atmosphere therein having a lower temperature than the air circulated in the refrigerated compartment.

Another object of my invention is to provide a food storage receptacle for the refrigerated compartments of refrigerators with means for impeding heat transfer thereto by radiant heat from the walls of the refrigerated compartments or bodies therein.

Further objects and advantages of my invention will become apparent as the following description proceeds and the features of novelty which characterize my invention will be pointed out with particularity in the claims annexed to and forming a part of this specification.

Figure 1:
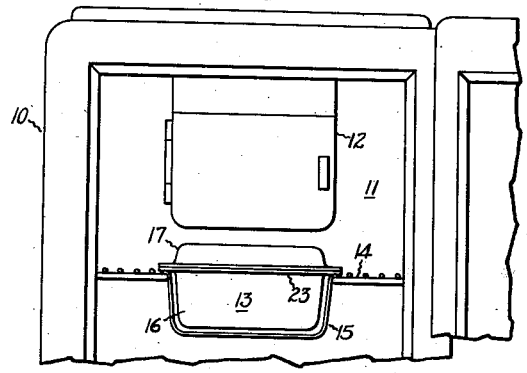
Figure 2:
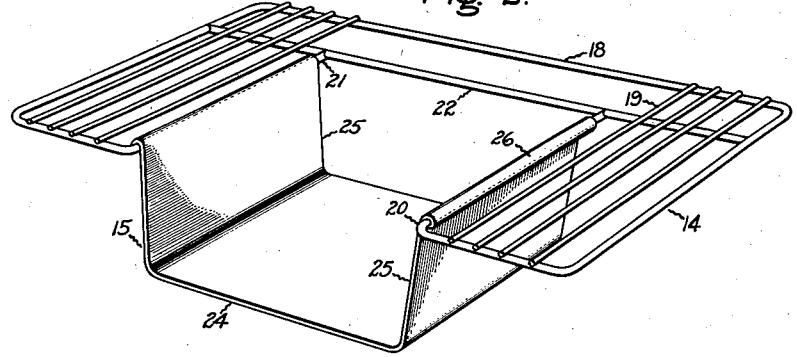
Figure 3:
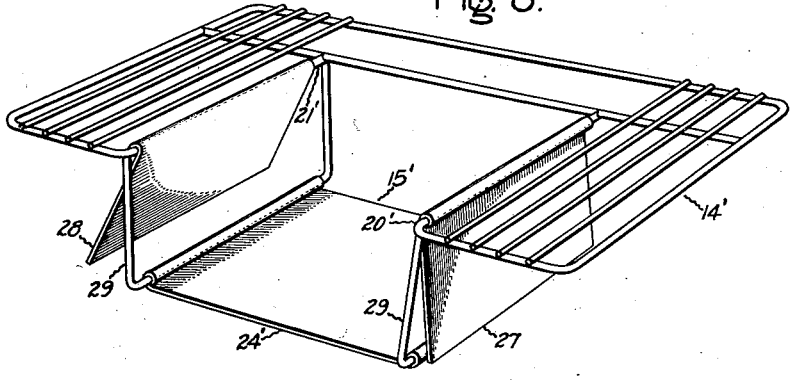

For a better understanding of my invention reference may be had to the accompanying drawing in which Fig. 1 is a fragmentary front elevational view of a domestic type refrigerator having a storage compartment provided with a food storage receptacle embodying my invention; Fig. 2 is an enlarged perspective view of the shield or baffle member and shelf shown in Fig. 1; and Fig. 3 is an enlarged perspective view illustrating a modification of the baffle or shield member illustrated in Fig. 1.

Referring to the drawing, I have illustrated a refrigerator 10 provided with walls defining a food storage compartment 11 and having a cooling unit or evaporator 12 arranged in the upper portion of the refrigerated compartment 11. In the form of the invention illustrated in Fig. 1, I have provided a food storage receptacle 13 adapted to be supported in a cut-away portion of the shelf 14 suitably supported below the evaporator 12 so that the receptacle 13 is adjacent the cooling unit 12. In order to impede the heat transfer from the walls defining the food compartment 11 and the articles stored therein to the receptacle 13 I have provided a baffle or shield member 15 about the side and bottom walls of the lower portion 16 of the receptacle 13.

Irrespective of the material from which the shield member is composed or the surfaces provided on the shield member 15, because of the spacing between the walls of the lower portion 16 of the receptacle 13 and the walls or surface of the shield member 15, a region of restricted air circulation is provided between receptacle 13 and shield member 15 which tends to limit the amount of heat transferred to the receptacle 13 by convection currents of air. This is accounted for by the fact that a substantial amount of the heat absorbed by the receptacle 13, when no baffle is provided is by convection. The transfer of heat by convection is reduced by the provision of a layer of relatively dead air. However, considerable of the heat transfer from the articles within the refrigerator and the refrigerator walls to the receptacle 13 is by radiation. By providing the shield member 15 with an outer surface having a high coefficient of reflection of radiant heat which means therefore a low coefficient of absorption of radiant heat, most of the radiant heat will be reflected from the surface of shield member 15 and hence prevented from reaching the receptacle 13. Some of the radiant heat will be absorbed, however, and in order to minimize the emission of this heat toward the receptacle 13, it is desirable to provide the portions of shield member 15 facing the receptacle 13 with a surface having a relatively low coefficient of emissivity of radiant heat. Since a surface having high heat reflecting characteristics also has low heat emission characteristics, it follows that it is desirable to provide both sides of shield member 15 with the same character of surface. These characteristics are best obtained from polished surfaces and I have found polished aluminum or stainless steel shield members to be entirely satisfactory. It will be understood, of course, that the above conditions are true only of low frequency radiant heat emitted from relatively low temperature bodies as distinguished from high frequency solar radiation. All of the bodies present in the refrigerated compartment 11 including the side walls of the refrigerated compartment 11, the shelves therein and articles supported on the shelves have a temperature well within the range of relatively low temperature bodies referred to and emit only low frequency radiant heat. I have found that a temperature of approximately 32° may be maintained in a food storage receptacle of the type illustrated at 13 in Fig. 1 having internal dimensions approximately 11 inches wide by 13 inches long by five inches deep, the upper surface of the cover 17 of the receptacle 13 being spaced approximately 1½ inches from the evaporator 12, even though the box air is approximately 40° F., when a shield member 15 of polished aluminum is arranged substantially coextensive with the side and bottom walls of the lower portion 16 of the receptacle 13 and spaced approximately ¼ of an inch therefrom.

Referring to the drawing in greater detail, I have shown in Fig. 2 the shelf 14 arranged with a suitable form of shield member 15. In the illustrated embodiment of my invention, the shelf 14 is provided with a marginal or rim member 18 and cross bars 19. Portions 20 and 21 of the marginal member 18 are broken at the front edge of the shelf 14 and bent rearwardly for connection with a transverse bar or member 22 thereby defining an opening in the shelf 14 for the accomodation of the receptacle 13. As illustrated in Fig. 1, the lower portion 16 of the receptacle 13 is provided with an outwardly directed flange 23 to permit receptacle 13 to slide in the opening in the shelf 14 thereby rendering the receptacle 13 convenient of access. The lower portion 16 of the receptacle 13 is provided with a cover portion 17 as shown.

The shield member 15, as illustrated in Fig. 2, comprises a bottom portion 24 and side portions 25. The upper edges of side portions 25 are provided with outwardly and downwardly turned flanges 26. As shown in Fig. 2, the flanges 26 are bent around the wire portions 20 and 21, respectively, in order to securely support the shield member 15 from the shelf 14. However, if it is desired to provide a removable shield member 15, the flanges 26 need not be turned under the wire portions 20 and 21. Other modes of supporting the shield member 15 may be utilized. For example, the shield member 15 may be removably or fixedly supported on the walls of the compartment 11 instead of from the shelf 14. Moreover, if desired, the baffle member 15 may be carried by the receptacle 13.

In the form of my invention illustrated in Fig. 1, there is no impediment to the radiation of heat to the receptacle 13 from the side walls of the compartment 11 above the shelf 14 or from stored articles extending above the shelf 14. If it is desired to eliminate radiation from these sources, the side walls 25 of the shield member 15 may be extended the desired distance above shelf 14. Moreover, the shield member 15 may be provided with front and rear walls but it should be noted that, if a front wall is provided, access to the storage receptacle 13 will be rendered less convenient.

It is not necessary that the storage receptacle 13 be placed adjacent the evaporator or cooling unit 12. The receptacle 13 may be placed at any portion of the compartment 11 as some benefit will be obtained wherever the receptacle is placed so long as the shield member 15 is interposed between the receptacle 13 and articles having a higher temperature than desired in receptacle 13.

In Fig. 3, I have illustrated a reflection baffle 15' of the same general arrangement as that illustrated in Figs. 1 and 2 except that the baffle is made in adjustable sections so that the amount of air circulating in contact with the sides of the storage receptacle and, therefore, the temperature, can be controlled. In the form illustrated in Fig. 3, the sides 27 and 28 of the reflection baffle 15' are pivotally carried by the wire portions 20' and 21', respectively, of the shelf 14'. However, any suitable means of adjustment may be substituted, if desired. The shelf 14' or the reflection baffle 15' or both may be provided with grooves in which sides 27 and 28 are adapted to be slid, for example. In the embodiment disclosed in Fig. 3, the bottom wall 24' of the reflection baffle 15' is shown supported from the shelf 14' by means of wire frames 29. Of course, the bottom wall 24' may also be made adjustable. Furthermore, any one or more of the sides 24', 27 or 28 may be made entirely removable, if desired.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In combination with a refrigerator provided with walls defining a storage compartment and having a cooling unit associated therewith, a food storage receptacle arranged in said compartment and a shield member interposed between said receptacle and a portion of said compartment, a substantial portion of the surface of said shield member presented towards said walls and bodies therein having a relatively low coefficient of absorption of radiant heat for impeding heat transfer from said walls of said compartment and bodies therein to said receptacle.

2. In combination with a refrigerator provided with walls defining a storage compartment and having a cooling unit associated therewith, a food storage receptacle arranged in said compartment adjacent said cooling unit and a shield member interposed between said receptacle and a portion of said compartment, a substantial portion of the surface of said shield member presented towards said walls having a relatively low coefficient of absorption of radiant heat for impeding heat transfer from said walls of said compartment and bodies therein to said receptacle.

3. In combination with a refrigerator provided with walls defining a storage compartment and having a cooling unit associated therewith, a food storage receptacle arranged in said compartment adjacent said cooling unit and a shield member interposed between said receptacle and a portion of said compartment, a substantial portion of the surface of said shield member presented towards said walls having a relatively low coefficient of absorption of radiant heat for impeding heat transfer from said walls of said compartment and bodies therein to said receptacle, and a substantial portion of the surface of said shield member presented towards said receptacle having a relatively low coefficient of emission of radiant heat for minimizing the heat transfer from said surface presented towards said receptacle to said receptacle.

4. In a refrigerator having a food storage compartment and a cooling unit for effecting cooling and circulation of air in said compartment, a food storage receptacle arranged in said compartment adjacent said cooling unit, and a shield member interposed between said receptacle and a portion of said compartment, said shield member having polished surfaces for impeding the heat transfer from the walls of said compartment and the bodies stored therein to said receptacle.

5. In a refrigerator having a food storage compartment and a cooling unit associated therewith, a food storage receptacle in said compartment adjacent said cooling unit and a shield member interposed between said receptacle and a portion of said compartment, said shield member being spaced from said receptacle for providing a layer of relatively dead air between said shield member and said receptacle, a substantial portion of the surface of said members presented toward the walls of said compartment having a relatively low coefficient of absorption of radiant heat.

6. In combination with a refrigerator provided with walls defining a storage compartment and having a cooling unit associated therewith, a shelf in said compartment, a storage receptacle supported by said shelf, a shield member interposed between said receptacle and a portion of said compartment, the surface of said shield member presented to the walls of said compartment and bodies therein having a low coefficient of absorption of radiant heat for impeding the heat transfer from the walls of said compartment and bodies therein to said receptacle.

7. In combination with a refrigerator provided with walls defining a storage compartment and having a cooling unit associated therewith, a shelf in said compartment, a storage receptacle supported by said shelf, a shield member about a substantial portion of the side and bottom walls of said receptacle and in spaced relation thereto, at least one surface of said shield member having a polished surface for impeding the heat transfer from the walls of said compartment and bodies therein to said receptacle.

8. In combination with a refrigerator provided with walls defining a storage compartment and having a cooling unit associated therewith, a shelf in said compartment, a storage receptacle supported by said shelf, a shield member about a substantial portion of the side and bottom walls of said receptacle and in spaced relation thereto, the surface of said shield member facing said storage space having a relatively low coefficient of absorption of radiant heat to impede heat transfer from the walls of said compartments and the bodies therein to said receptacle and the surface of said shield member facing said receptacle having a relatively low coefficient of emission of radiant heat to impede heat transfer from said shield member to said receptacle.

9. In combination with a refrigerator provided with a storage space and a cooling unit for effecting cooling and circulation of air in said storage space, a food storage receptacle arranged in said compartment and a shield member interposed between said receptacle and a portion of said compartment, a portion of said shield member being adjustable for varying the amount of surface of said receptacle presented for contact with the circulating box air.

10. In combination with a refrigerator provided with a storage space and a cooling unit for effecting cooling and circulation of air in said storage space, a food storage receptacle arranged in said compartment and a shield member interposed between said receptacle and a portion of said compartment, a portion of said shield member being removable for varying the amount of surface of said receptacle presented for contact with the circulating box air.

11. In combination with a refrigerator provided with a storage space and a cooling unit for effecting cooling and circulation of air in said storage space, a food storage receptacle arranged in said compartment and a shield member interposed between said receptacle and a portion of said compartment, opposite side walls of said shield member being pivotally arranged for varying the amount of surface presented for contact with the circulating box air.

12. In combination with a refrigerator provided with a storage space and a cooling unit for effecting cooling and circulation of air in said storage space, a food storage receptacle arranged in said compartment and a shield member interposed between said receptacle and a portion of said compartment, a portion of said shield member being adjustable for varying the amount of surface of said receptacle presented for contact with the circulating box air, a substantial portion of the surface of said shield member presented towards said walls and bodies therein having a relatively low coefficient of absorption of radiant heat for impeding heat transfer from said walls of said compartment and bodies therein to said receptacle.

DELBERT F. NEWMAN.